(12) United States Patent
Takasaki

(10) Patent No.: US 8,622,596 B2
(45) Date of Patent: Jan. 7, 2014

(54) AUTOMOTIVE INTERIOR LAMP

(75) Inventor: Tetsuro Takasaki, Makinohara (JP)

(73) Assignee: Yazaki Corporation, Tokyo (JP)

(*) Notice: Subject to any disclaimer, the term of this patent is extended or adjusted under 35 U.S.C. 154(b) by 132 days.

(21) Appl. No.: 13/109,181

(22) Filed: May 17, 2011

(65) Prior Publication Data

US 2011/0280027 A1 Nov. 17, 2011

(30) Foreign Application Priority Data

May 17, 2010 (JP) ................. 2010-113375

(51) Int. Cl.
| | |
|---|---|
| B60Q 1/00 | (2006.01) |
| B60Q 3/00 | (2006.01) |
| B60Q 1/26 | (2006.01) |
| B60Q 11/00 | (2006.01) |
| F21V 21/00 | (2006.01) |
| F21V 21/08 | (2006.01) |

(52) U.S. Cl.
USPC ............ 362/488; 362/396; 362/490; 362/493

(58) Field of Classification Search
USPC ......... 362/459, 487, 488, 306, 374, 479, 490, 362/549, 365, 396; 24/458, 581.11
See application file for complete search history.

(56) References Cited

U.S. PATENT DOCUMENTS

| | | | | |
|---|---|---|---|---|
| 1,589,760 | A * | 6/1926 | Kuen | 362/374 |
| 4,969,072 | A * | 11/1990 | Pye | 362/549 |
| 6,250,787 | B1 * | 6/2001 | Matubara | 362/520 |
| 6,749,324 | B2 * | 6/2004 | Nagai et al. | 362/490 |
| 7,287,890 | B2 * | 10/2007 | Okabe et al. | 362/548 |
| 2003/0026104 | A1 | 2/2003 | Nagai et al. | |
| 2004/0252514 | A1 | 12/2004 | Okabe et al. | |
| 2009/0073707 | A1 | 3/2009 | Nagai et al. | |

FOREIGN PATENT DOCUMENTS

| | | |
|---|---|---|
| CN | 1257172 A | 6/2000 |
| CN | 1400122 A | 3/2003 |
| CN | 101386280 A | 3/2009 |
| JP | 2005-001459 A | 1/2005 |

OTHER PUBLICATIONS

Office Action dated May 14, 2013 issued by the State Intellectual property Office of P.R. China in corresponding Chinese Patent Application No. 201110127989.9.

* cited by examiner

*Primary Examiner* — Jong-Suk (James) Lee
*Assistant Examiner* — Erin Kryukova
(74) *Attorney, Agent, or Firm* — Sughrue Mion, PLLC

(57) ABSTRACT

A lamp assembly to be attached with a reinforcement through an opening formed in a roof panel is provided. A clip to be locked with the reinforcement is provided in the lamp assembly. The clip includes a base portion connected to the housing, an inverted U-shape portion connected to the base portion, a lock connected to the inverted U-shape portion, a projecting piece projected from a lower end of the lock, an extension portion extended further downwards from the projecting piece, and a side projecting piece formed on a side surface of the extension portion at a lower portion. A front projecting piece which faces the side projecting piece with a space provided therebetween is formed on the housing. The side projecting piece comes in contact with the front projecting piece in a state where the clip is locked on a circumferential edge of an opening of the reinforcement.

4 Claims, 7 Drawing Sheets

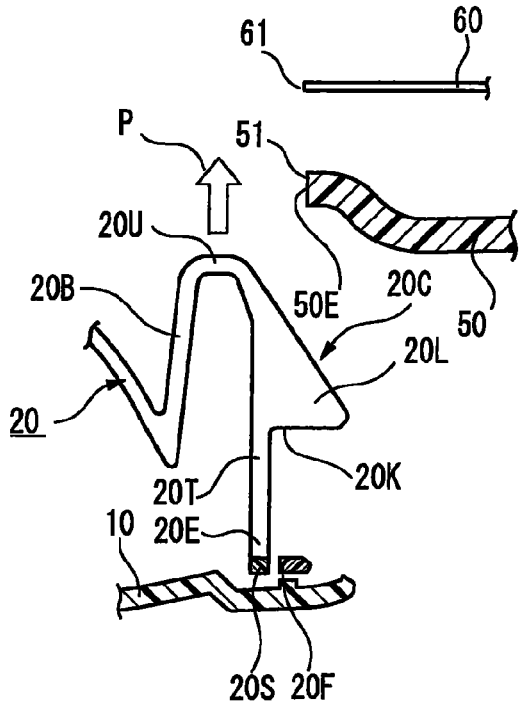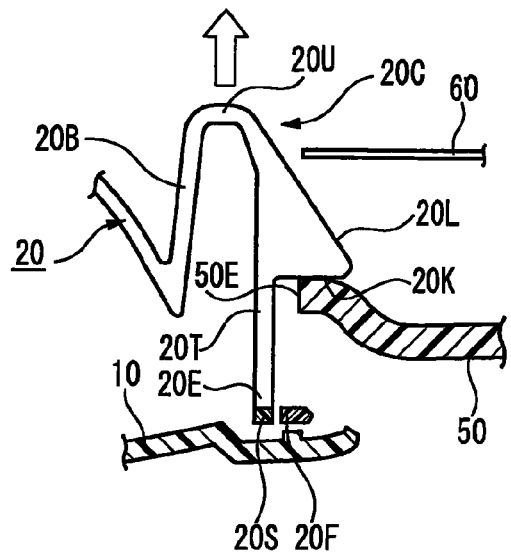
Fig. 5A  Fig. 5B
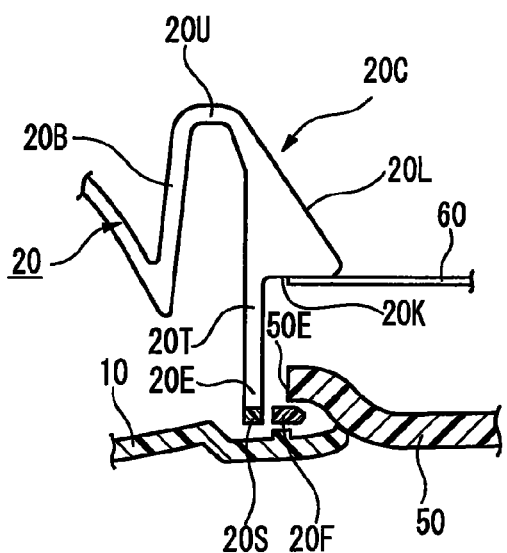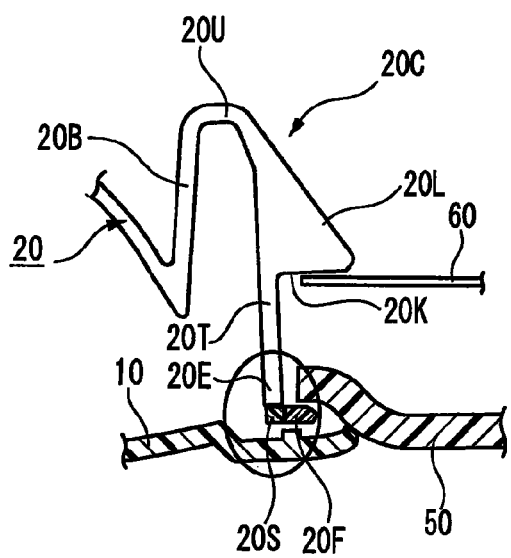
Fig. 5C  Fig. 5D

AUTOMOTIVE INTERIOR LAMP

BACKGROUND

The present invention is related to an automotive interior lamp.

Conventionally, there is known an automotive interior lamp described in Patent Document 1 which is used to attach an interior lamp to a ceiling of a passenger compartment (refer to Patent Document 1).

In an attaching construction of a lamp unit described in Patent Document 1, a fixing device for fixing an interior lamp and a reinforcement together is provided on an reinforcement side of a holder so as to hang therefrom. In addition, flexible arms and flexible arm restricting portions are provided. The flexible arms are each bent into an inverted U-shape, and a distal end portion of the flexible arm is locked on an attachment portion of the reinforcement. The flexible arm restricting portions are provided at a side of the corresponding flexible arms so as to be brought into engagement with supporting pieces of the corresponding flexible arms to thereby restrict the distal end portions of the flexible arms from being displaced along an attachment/detachment direction of the interior lamp.

According to the attaching construction of Patent Document 1, a module can be installed in the vehicle body panel in an ensured fashion by the distal end portions of the flexible arms. In addition, the distal end portions of the flexible arms are not displaced towards the interior of the passenger compartment along the attachment/detachment direction of the interior lamp to/from the vehicle body panel when the module is installed on the vehicle body panel. Therefore, an excessive clearance is unnecessary between an attachment portion on the vehicle body panel and the module in consideration of the displacement of the distal end portions of the flexible arms. Additionally, even when a strong external force is exerted on the fixed module which directs the module towards the interior of the passenger compartment with respect to the vehicle body panel, the flexible arms are advantageously prevented from being disengaged from the fixed state to the attachment portions of the reinforcement.

On the other hand, since a slide construction is needed in a mold for forming the flexible arms in the attaching construction of Patent Document 1, costs for the mold is increased.

A resin clips 200C in a related art are shown in FIGS. 6A to 7B. FIGS. 6A and 6B show one of the resin clips 200C provided in a four corners of a housing 20 (FIG. 2). FIG. 6A is a perspective view and FIG. 6B is a vertical sectional view of the clip 200C. As is shown in the sectional view in FIG. 6B, the resin clip 200C includes a base portion 200B connected to the housing 20, an inverted U-shape portion 200U connected to the base portion 200B, a lock 200L connected to the inverted U-shape portion 200U and forming a hook portion 200K and a projecting piece 200T formed at a lower portion of the lock 200L to thereby be configured as a spring formed into an inverted U-shape in whole and exhibiting an elastic force resulting from the elasticity of the resin material of which the resin clip 200C is formed.

The resin clips 200C having elasticity are formed in the four corners (refer to FIG. 2) of the housing 20. Therefore, when the respective locks 200L of the four resin clips 200C are pushed up towards the circumferential edge 61 (FIG. 3) of an opening in a reinforcement 60 (FIG. 3) from below, the locks 200L ride over the circumferential edge 61 of the opening in the reinforcement 60 due to their inclined portions and the elastic force exhibited by the resin clips 200C, and the hooks 200K of the locks 200L lock on the circumferential edge 61 of the opening in the reinforcement 60, whereby a lamp assembly 40 (FIG. 2) including the housing 20 is installed on the reinforcement 60 (FIG. 3) in such a state as shown in FIG. 6B.

In the automotive interior lamp 100 including the resin clips 200C of the related art, when a force acts in a downward direction F1 (FIG. 7A) due to the weight of the lamp assembly 40, lower end portions of the locks 200L of the resin clips 200C move in a direction F2 in FIG. 7A, as a result of which the housing 20 hangs by a distance t1 as is shown in FIG. 7B, resulting in a fear that the exact attached state cannot be maintained.

[Patent Document 1] Japanese Patent Publication No. 2005-1459

SUMMARY

It is therefore one advantageous aspect of the present invention to provide an automotive interior lamp having a shape for which a mold with a slide construction is needed, to thereby reduce costs.

Further, it is therefore another advantageous aspect of the present invention to provide an automotive interior lamp which prevents a housing from hanging by preventing lower end portions of resin clips from opening even when the lower end portions of the resin clips attempt to open by the own weight of a lamp assembly after attachment.

According to one aspect of the invention, there is provided a lamp assembly configured to be attached with a reinforcement through an opening formed in a roof panel, the lamp assembly comprising:

a housing;

a clip, configured to be locked with a circumferential edge of an opening of the reinforcement, and including a base portion connected to the housing, an inverted U-shape portion connected to the base portion, a lock connected to the inverted U-shape portion, a projecting piece projected from a lower end of the lock, an extension portion extended further downwards from the projecting piece, and a side projecting piece formed on a side surface of the extension portion at a lower portion; and a front projecting piece, formed on the housing, facing the side projecting piece with a space provided therebetween, wherein the side projecting piece is configured to come in contact with the front projecting piece in a state where the clip is locked on the circumferential edge of the opening of the reinforcement.

A distance between the front projecting piece and the reinforcement may be a length from the lower end of the lock to a distal end of the extension portion.

According to another aspect of the invention, there is provided an automotive interior lamp, comprising: a roof panel formed with an opening; a reinforcement; and the lamp assembly attached with the reinforcement through the opening of the roof panel.

BRIEF DESCRIPTION OF DRAWINGS

FIG. 5A is a sectional view showing a state before a primary locking for the resin clip shown in FIG. 4A.

FIG. 5B is a sectional view showing a state of the primary locking for the resin clip shown in FIG. 4A.

FIG. 5C is a sectional view showing a state of a secondary locking for the resin clip shown in FIG. 4A.

FIG. 5D is a sectional view of the resin clip shown in FIG. 4A explaining a reason that the housing is prevented from hanging.

DETAILED DESCRIPTION OF EXEMPLIFIED EMBODIMENT

Hereinafter, an automotive interior lamp according to an embodiment of the present invention is described.

Figure 1:
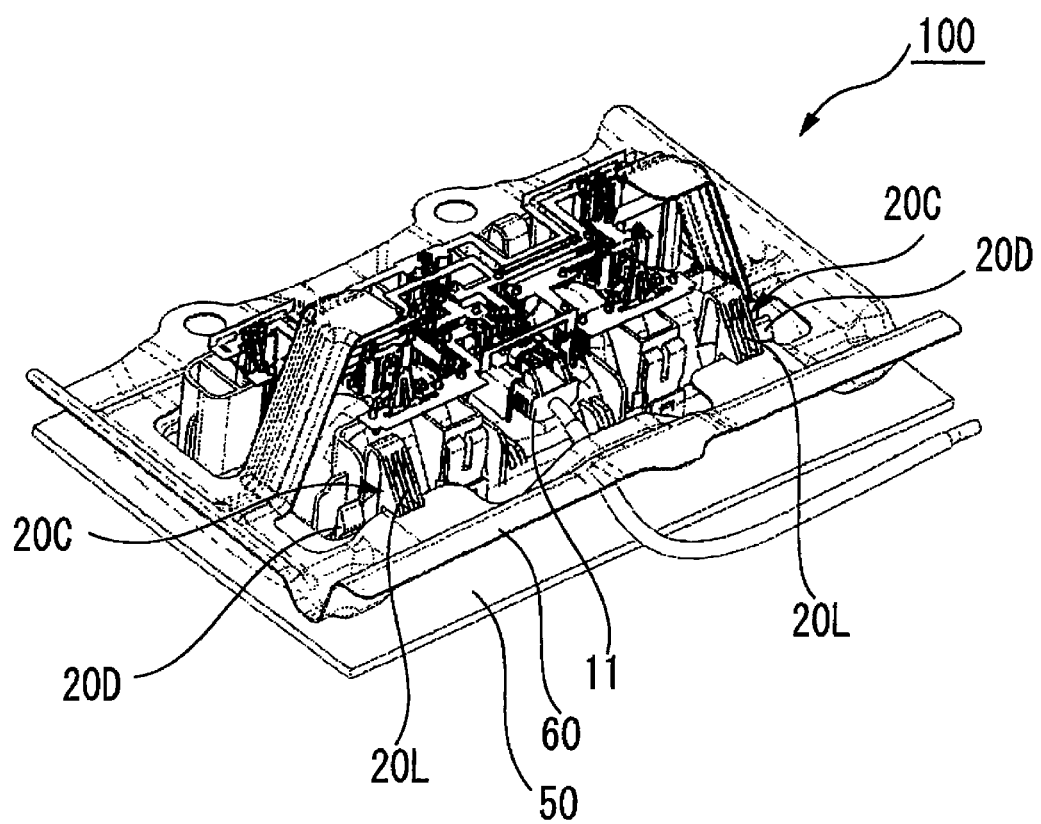
FIG. 1 is a perspective view of an automotive interior lamp which is installed in a vehicle.
Figure 2:
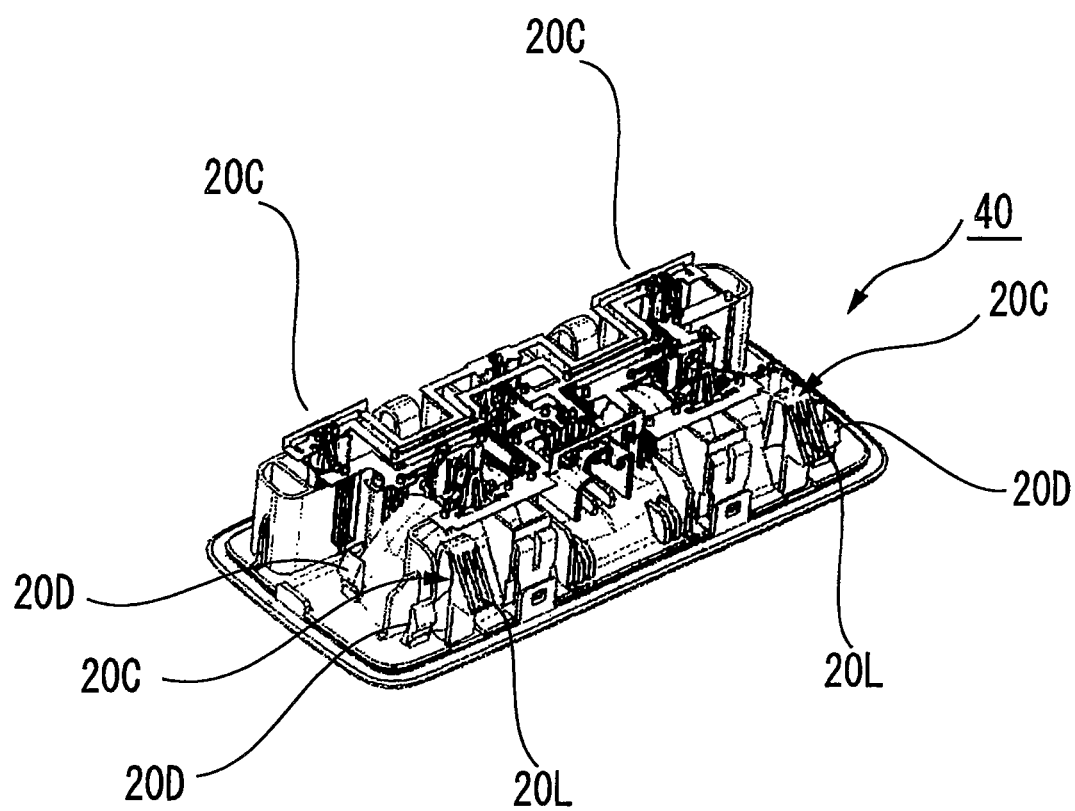
FIG. 2 is a perspective view of a lamp assembly which is made up of residual parts resulting after a connector, a roof panel and a reinforcement are removed from the automotive interior lamp shown in FIG. 1.
Figure 3:
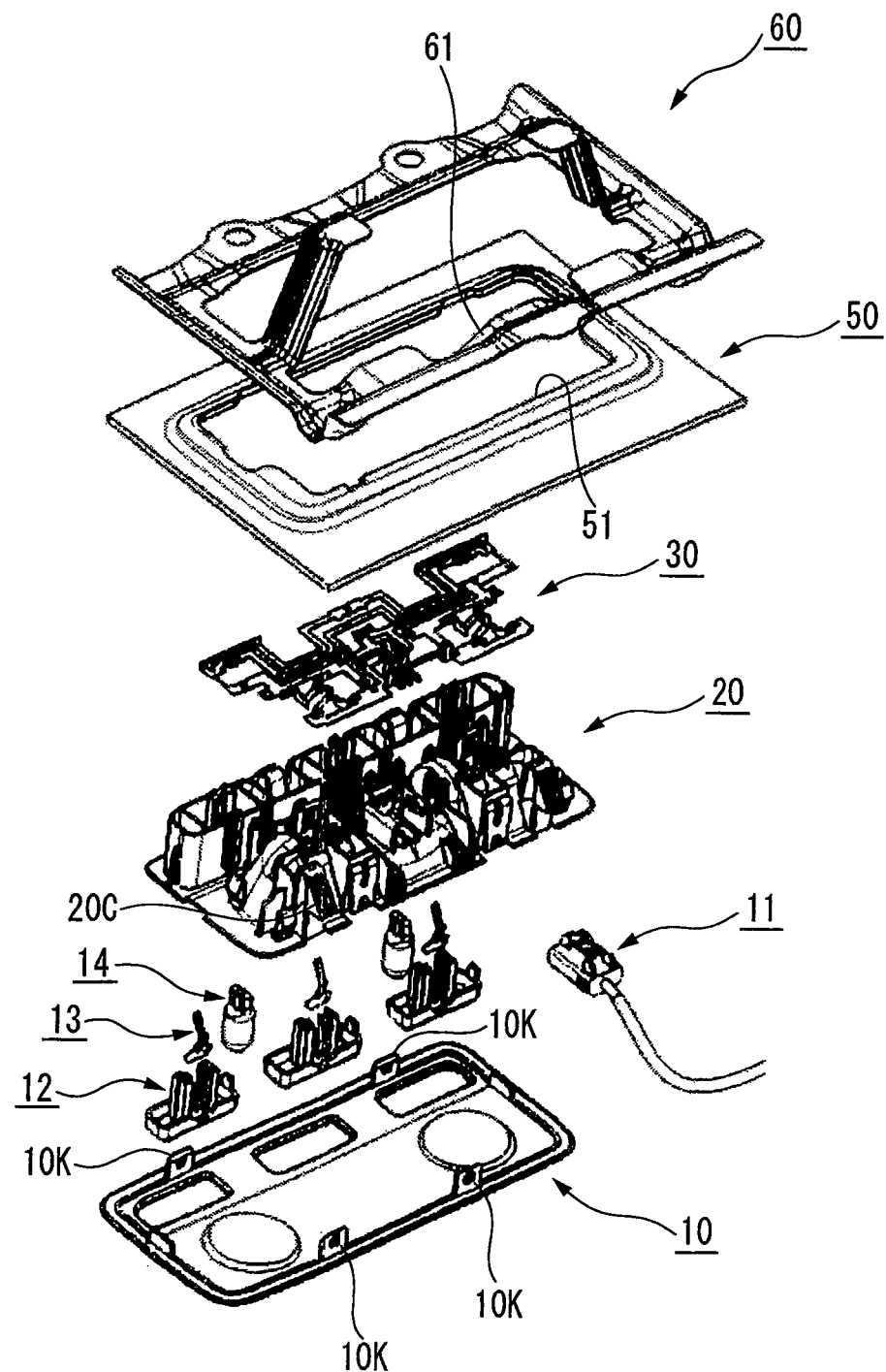
FIG. 3 is an exploded perspective view of the automotive interior lamp shown in FIG. 1.

FIG. 1 is a perspective view of an automotive interior lamp 100 which is installed in a vehicle. FIG. 2 is a perspective view of a lamp assembly 40 which is made up of residual parts resulting after a connector 11, a roof panel 50 and a reinforcement 60 are removed from the automotive interior lamp 100 shown in FIG. 1. FIG. 3 is an exploded perspective view of the automotive interior lamp 100 shown in FIG. 1 which is depicted as being installed in the vehicle.

In FIGS. 1 to 3, the lamp assembly 40 is integrally built up by installing switch knobs 12, contacts 13 and bulbs 14 in a housing 20, fitting a busbar 30 from above in the housing 20 for electrically connecting electric parts in the housing to make up a lamp function portion, fitting a lens 10 which constitutes a design portion on the housing 20 from below, and causing locking pieces 10K which are provided at four locations on a circumferential edge of the lens 10 to be locked on corresponding locking portions on the housing 20.

In an automotive interior lamp 100 installed in the vehicle, a lamp assembly 40 is installed on the roof panel 50 by use of resin clips 20C provided on the lamp assembly 40 so as to assemble a roof module. In addition, a connector 11 is fitted in a connecting portion of the housing 20, and the roof module is installed on the reinforcement 60 which is a vehicle body side part by use of the resin clips 20C, whereby the automotive interior lamp 100 installed in the vehicle is completed.

First, to install the automotive interior lamp 100 in the vehicle, a primary locking is performed. In the primary locking, the lamp assembly 40 is moved to approach the roof panel 50 from below, so that the resin clips 20C of the housing 20 which makes up the lamp assembly 40 are locked on a circumferential edge 51 of the opening in the roof panel 50, to assemble the roof module. Following this, a secondary locking is performed. In the secondary locking, the roof module is moved to approach the reinforcement 60 from below, so that the resin clips 20C of the housing 20 which makes up the lamp assembly 40 are locked on a circumferential edge 61 of the opening in the reinforcement 60. Locking arms 20D are locked on the circumferential edge 51 of the opening in the roof panel 50 when the resin clips 20C are locked on the circumferential edge 61.

As shown in FIG. 2, the resin clips 20C are formed in four corners of the housing 20. In FIG. 4, one of the resin clips 20C which is disposed at a left front of the housing 20 is shown.

Figure 4A:
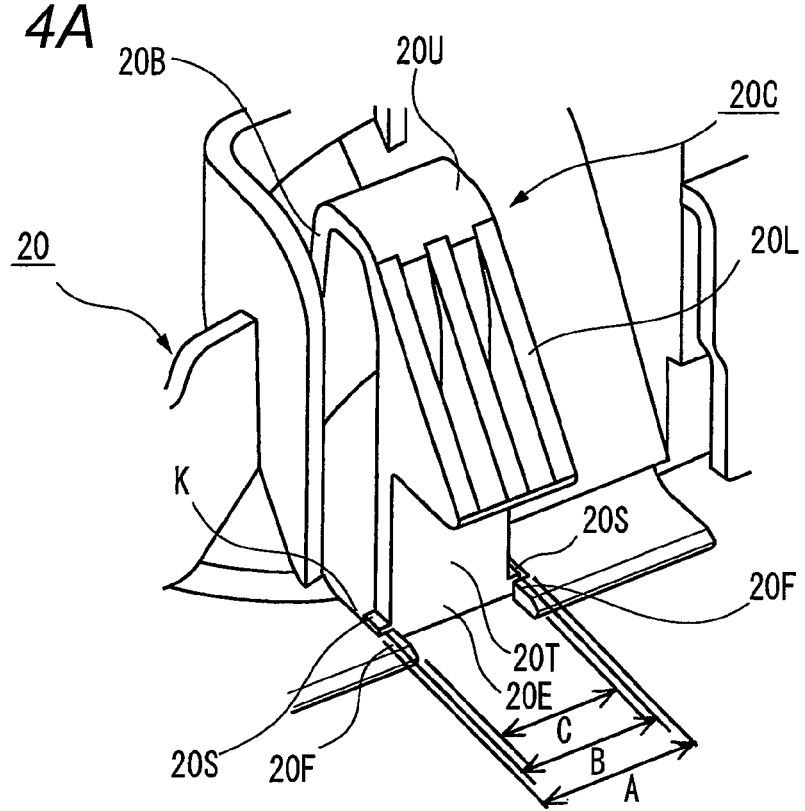
FIG. 4A is a perspective view showing a resin clip according to an embodiment of the invention.
Figure 4B:
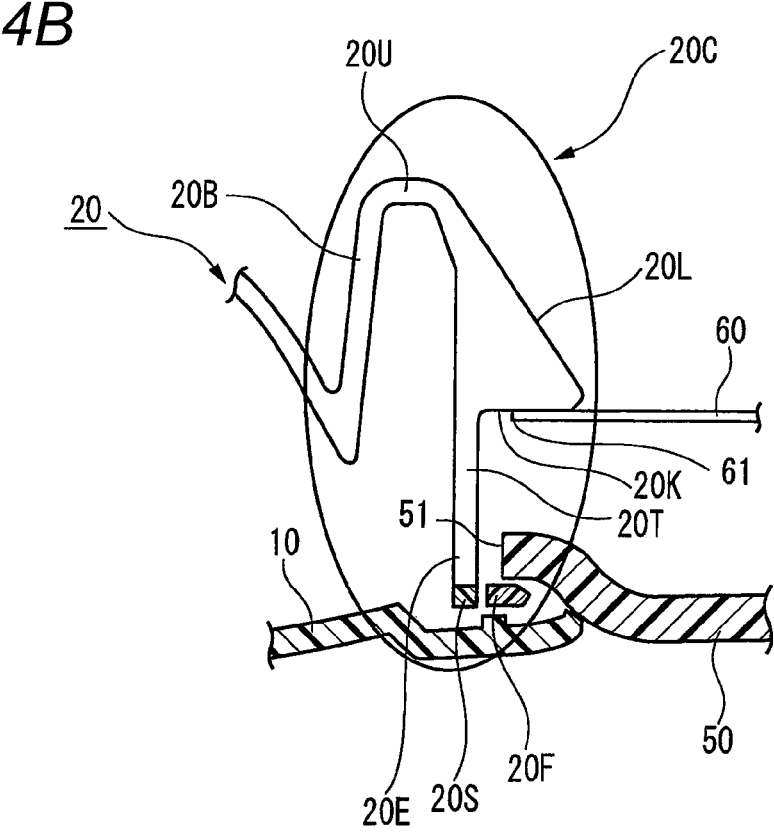
FIG. 4B is a vertical sectional view showing the resin clip shown in FIG. 4A.

As shown in FIG. 4B, the resin clip 20C includes a base portion 20B connected to the housing 20, an inverted U-shape portion 20U connected to the base portion 20B, a lock 20L connected to the inverted U-shape portion 20U and in which a hook 20K is formed, a projecting piece 20T formed at a lower portion of the lock 20L and an extension portion 20E connected to the projecting piece 20T and extending further downwards, and a side projecting piece 20S is formed on each of side surfaces of the extension portion 20E. The side projecting piece 20S is projected from each of the side surfaces in a direction crossing an extending direction of the extension portion 20E.

Figure 6A:
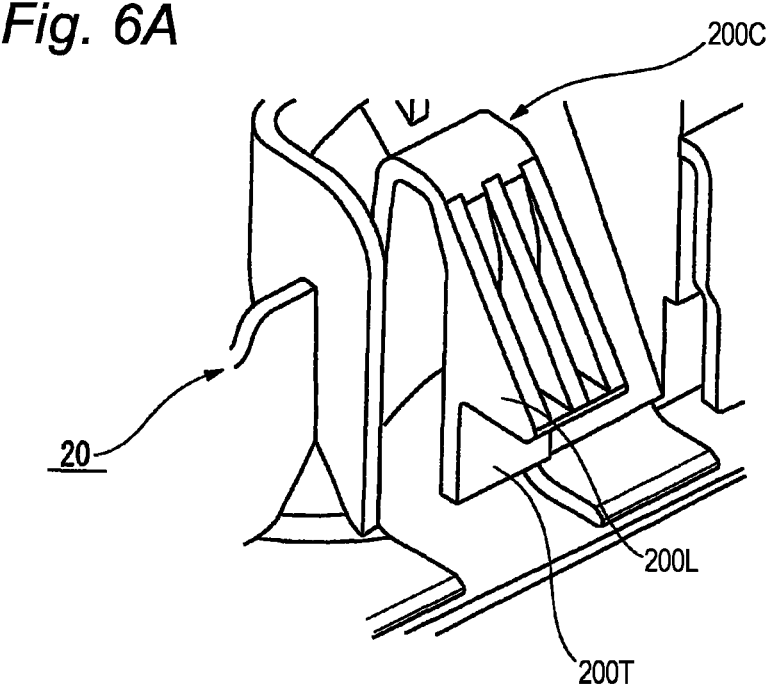
FIG. 6A is a perspective view showing one of resin clips according to the related art.
Figure 6B:
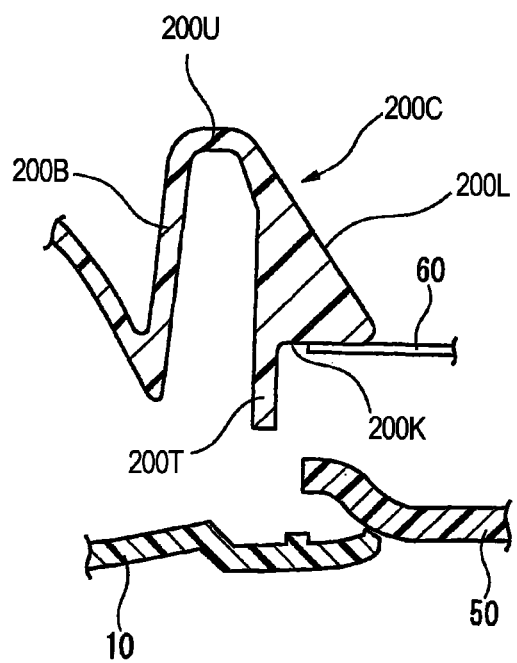
FIG. 6B is a vertical sectional view of the one of the resin clips shown in FIG. 6A.
Figures 7A, 7B:
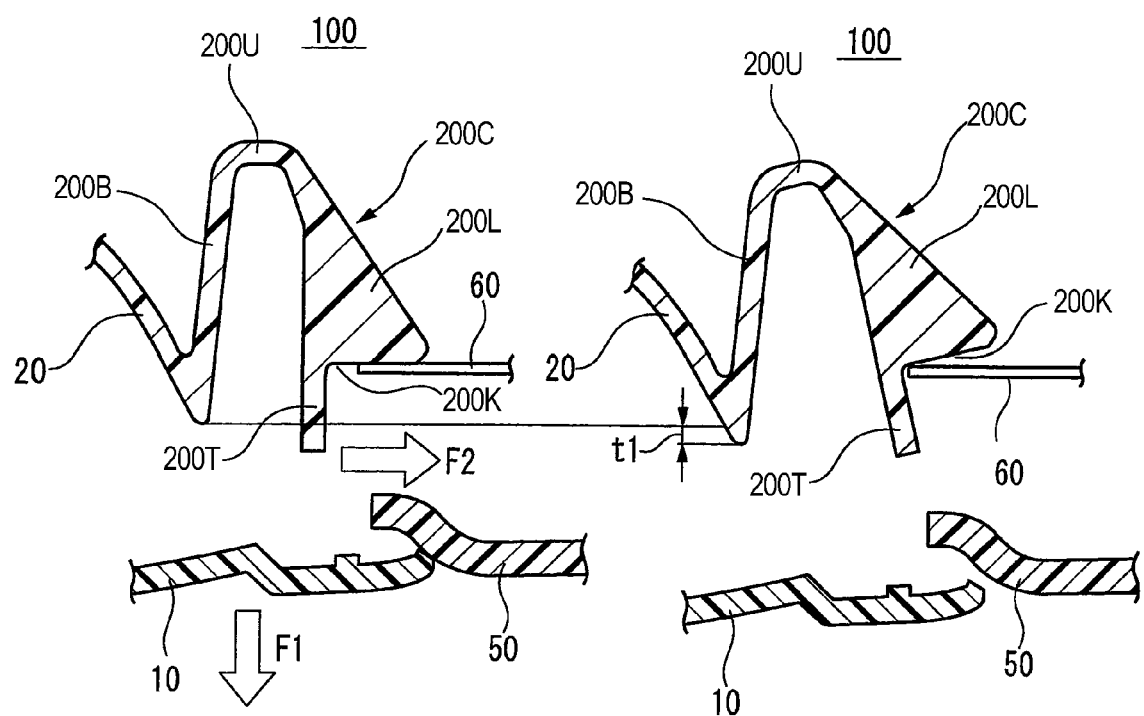
FIG. 7A is a sectional view showing a state in which a lock of the resin clip shown in FIG. 6A is locked on a circumferential edge of an opening in a reinforcement.
FIG. 7B is a sectional view of the state shown in FIG. 7A explaining a state where the housing hangs.

The resin clip 20C of the present invention shown in FIG. 4 differs from the resin clip 200C of the invention of the related art shown in FIG. 6 in that (1) the extension portion 20E is provided which is connected to the projecting piece 20T formed at the lower portion of the lock 20L so as to extend further downwards and that (2) the side projecting pieces 20S are formed at lower ends of the side surfaces of the extension portion 20E so as to be brought into contact with front projecting pieces 20F formed on the housing 20.

As shown in FIG. 3, a circumferential edge 51 is formed in an opening in a roof panel 50 according to the invention for primary locking of the resin clips 20C before the resin clips 20C are locked on the circumferential edge 61 of an opening in the reinforcement 60.

The resin clip 20C of the housing 20 shown in FIG. 6 is formed so that no restriction member is formed on outer sides thereof. On the other hand, in the housing 20 according to the invention shown in FIG. 4, the front projecting pieces 20F are formed on a surface of the housing 20 which the side projecting pieces 20S formed on both the side surfaces of the extension portion 20E at the lowermost end of the resin clip 20C face with a space defined therebetween.

Consequently, the front projecting pieces 20F prevent the corresponding side projecting pieces 20S from being opened outwards, thereby making it possible to prevent the deformation of the resin clip.

As shown in FIGS. 4A and 4B, cutouts K are provided in the housing 20, and the front projecting pieces 20F are formed in the positions which face the side projecting pieces 20S.

A dimension A between the cutouts K is larger than a width dimension B of the side projecting piece 20S. The width dimension B of the side projecting piece 20S is larger than a dimension C between the front projecting pieces 20F.

Consequently, the resin clip is formed integrally between the cutouts K within the dimension A, whereby the housing 20 can be molded only by upper and lower molds without using a slide.

FIGS. 5A to 5D show vertical sectional views explaining steps of installing the resin clip 20C on the roof panel 50 and the reinforcement 60. FIG. 5A is a sectional view showing a state before a primary locking. FIG. 5B is a sectional view showing a state of the primary locking. FIG. 5C is a sectional view showing a state of a secondary locking. FIG. 5D is a sectional view explaining the reason that the housing 20 is prevented from hanging. In FIG. 5A, the circumferential edge 51 of the opening in the roof panel 50 rises upwards from a base portion of the roof panel 50 to approach the reinforcement 60 and extends slightly further leftwards (closer to a center of the opening) than the circumferential edge 61 of the opening in the reinforcement 60.

When the lock 20L of the resin clip 20C is moved to approach the roof panel 50 in a direction indicated by an arrow P from below the roof panel 50 as is shown in FIG. 5A, the lock 20L rides over the circumferential edge 51 of the opening in the roof panel 50 due to its elasticity (the primary locking). A roof module is obtained by this primary locking. Following this, when the roof module is raised further, the lock 20L rides over the circumferential edge 61 of the opening in the reinforcement 60 due to its elasticity, and the hook 20K of the resin clip 20C is locked on the circumferential edge 61 of the opening in the reinforcement 60 as is shown in FIG. 5C (the secondary locking). As this occurs, the side projecting pieces 20S provided at the lower ends of both the sides of the lower portion of the extension portion 20E come into contact with the corresponding front projecting pieces 20F of the housing as is shown in FIG. 5D, so as to prevent the outward opening of the resin clip 20C, whereby the lamp assembly 40 including the housing 20 is installed firmly on the reinforcement 60.

In the automotive interior lamp 100 obtained in the way described above, even when a downward force is exerted on the lamp due to the own weight of the lamp assembly 40, the side projecting pieces 20S on the extension portion 20E provided according to the invention come into abutment with the corresponding front projecting pieces 20F, so as to prevent the outward opening of the resin clip 20C. As a result of this, the housing 20 is prevented from hanging.

In addition, a space between the front projecting pieces 20F of the housing 20 and the reinforcement 60 is equal to a length from the hook 20K of the resin clip 20C to a distal end of the extension portion 20E in such a state that the resin clip 20C is locked on the reinforcement 60 (FIG. 5C). Therefore, even when the downward force is exerted on the lamp due to the own weight of the lamp assembly 40, only a small force is exerted on the front projecting pieces 20F of the housing 20, and therefore, the strength of the front projecting pieces 20F does not have to be high.

Thus, according to the invention, the use of a mold with a slide construction, which constitutes the problem inherent in the conventional automotive interior lamp, does not have to be used, and the excessive deformation due to the hanging of the housing, which also constitutes the problem inherent in the conventional automotive interior lamp, can be prevented.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A lamp assembly configured to be attached with a reinforcement through an opening formed in a roof panel, the lamp assembly comprising:
  a housing;
  a clip, configured to be locked with a circumferential edge of an opening of the reinforcement, and including a base portion connected to the housing, an inverted U-shape portion connected to the base portion, a lock connected to the inverted U-shape portion and protruding in a frontal direction, a projecting piece projected from a lower end of the lock extending in a downward direction, an extension portion extended further downwards from the projecting piece, and two side projecting pieces protruding from each side surface of the extension portion at a lower portion in a lateral direction,
  wherein the frontal direction, the downward direction and the lateral direction are perpendicular from one another; and
  two front projecting pieces, formed on the housing, facing the two side projecting pieces in the frontal direction with a space provided therebetween, each front projecting piece extending inwardly in the lateral direction,
  wherein in a state where the clip is locked on the circumferential edge of the opening of the reinforcement, the space is eliminated such that the two side projecting pieces contact with the two front projecting pieces to prevent excessive rotation of the clip.

2. The assembly according to claim 1, wherein
  a distance between the two front projecting pieces and the reinforcement is a length from the lower end of the lock to a distal end of the extension portion.

3. An automotive interior lamp, comprising:
  a roof panel formed with an opening;
  a reinforcement; and
  the lamp assembly according to claim 1, the lamp assembly being attached with the reinforcement through the opening of the roof panel.

4. The assembly according to claim 1, wherein the two front projecting pieces extend in a direction parallel with the lateral direction and the two front projecting pieces do not extend beyond the side surface of the extension portion in the lateral direction.

* * * * *